US006928090B1

(12) United States Patent
Peremans et al.

(10) Patent No.: US 6,928,090 B1
(45) Date of Patent: Aug. 9, 2005

(54) DEVICE AND PROCESS FOR MODE-LOCKING A LASER

(75) Inventors: André Peremans, Malonne (BE); Alaa Addin Mani, Namur (BE); Paul Thiry, Rixensart (BE)

(73) Assignee: Facultes Universitaires Notre-Dame de la Paix, Namur (BE)

( * ) Notice: Subject to any disclaimer, the term of this patent is extended or adjusted under 35 U.S.C. 154(b) by 0 days.

(21) Appl. No.: 10/009,337

(22) PCT Filed: May 3, 2000

(86) PCT No.: PCT/BE00/00049

§ 371 (c)(1),
(2), (4) Date: Nov. 2, 2001

(87) PCT Pub. No.: WO00/67351

PCT Pub. Date: Nov. 9, 2000

(30) Foreign Application Priority Data

May 3, 1999 (BE) ..................................... 9900314

(51) Int. Cl.[7] ........................... H01S 3/098; H01S 3/10
(52) U.S. Cl. ......................................... 372/18; 372/21
(58) Field of Search ...................................... 372/9–28

(56) References Cited

U.S. PATENT DOCUMENTS

| 4,829,528 | A | * | 5/1989 | Band et al. ..................... 372/3 |
| 4,914,658 | A | * | 4/1990 | Stankov et al. ................ 372/18 |
| 5,257,274 | A | * | 10/1993 | Barrett et al. .................. 372/20 |
| 5,436,920 | A | * | 7/1995 | Minemoto et al. ............. 372/21 |
| 5,661,594 | A | * | 8/1997 | Rhoads et al. ............... 359/299 |
| 5,675,596 | A | * | 10/1997 | Kong et al. .................... 372/25 |
| 5,909,456 | A | * | 6/1999 | Oka ............................. 372/22 |

(Continued)

FOREIGN PATENT DOCUMENTS

EP 0 951 111 10/1999

OTHER PUBLICATIONS

Buchvarov et al., "Nonlinear doubling mode-locking of feedback controlled pulsed Nd:YAG :laser," *Optics Communications*. vol. 118, No. 1/2, pp. 51-54 (Jul. 1995).

(Continued)

*Primary Examiner*—Minsun Oh Harvey
*Assistant Examiner*—Phillip Nguyen
(74) *Attorney, Agent, or Firm*—Merchant & Gould P.C.

(57) ABSTRACT

The invention relates to a device for a laser blocked-mode, especially for a pulsed laser, comprising a cavity resonator (20) which is defined by a first mirror (1) and a second mirror (8), and fitted with an amplifying active laser medium (5) for the amplification of a beam of laser radiation of a fundamental frequency ($\omega 1$) and a solid, non-linear optic means (10) comprising at least said second mirror (8) for reversible conversion of the radiation of the fundamental frequency ($\omega 1$) into radiation of a harmonic frequency ($\omega 2$) whereby said non-linear optic means (10) has a reflection factor which increases with the intensity of the radiation of a fundamental frequency. The invention is characterized in that said device also comprises a solid intensity limiter (4) in the cavity resonator (20), whereby the transmission factor of the laser radiation decreases with the intensity of said radiation. The invention also relates to a method for a laser blocked-mode, especially for a pulsed laser, using said device.

11 Claims, 2 Drawing Sheets

U.S. PATENT DOCUMENTS

| | | | | |
|---|---|---|---|---|
| 5,986,828 A | * | 11/1999 | Wood et al. | 359/890 |
| 6,144,679 A | * | 11/2000 | Herman et al. | 372/21 |
| 6,252,892 B1 | * | 6/2001 | Jiang et al. | 372/11 |
| 6,275,512 B1 | * | 8/2001 | Fermann | 372/6 |
| 6,546,027 B1 | * | 4/2003 | Khaydarov | 372/10 |
| 2003/0172736 A1 | * | 9/2003 | Blouin et al. | 73/643 |
| 2004/0021063 A1 | * | 2/2004 | Dultz et al. | 250/225 |

OTHER PUBLICATIONS

Del Corno et al., "Shortening of pulses from an active passive mode-locked Nd:Yag laser through two photon absorption in GaAs," *Proceedings of the Conference on Lasers and Electro-optics (CLEO)*, vol. 7, pp. 120-122 (May 1990).

Stankov, K.A., "Negative feedback using a nonlinear mirro for the generation of a long train of short light pulses," *Appl. Phys. B: Photo-physics and Laser Chemistry*, vol. B52, No. 3, pp. 158-162 (1991).

Keller, U., "Self-starting femtosecond mode-locked Nd: glass laser that uses intracavity saturable absorbers," *Optics Letters*, vol. 18, No. 13, pp. 1077-1079 (Jul. 1993).

Buchvarov et al., "Pulse shortening in an actively mode-locked laser with a frequency-doubling nonlinear mirror," *Optics Communications*, vol. 83, No. 3/4, pp. 241-245 (Jun. 1991).

Martinez et al., "Deterministic passive mode locking of solid-state lasers," *Appl. Phys. Lett.*, vol. 39, No. 11, pp. 875-877 (Dec. 1981).

* cited by examiner

DEVICE AND PROCESS FOR MODE-LOCKING A LASER

CROSS-REFERENCE TO RELATED APPLICATIONS

Belgium 9900314 filed May 3, 1999.

STATEMENT REGARDING FEDERALLY SPONSORED RESEARCH OR DEVELOPMENT

Not Applicable

INCORPORATION-BY-REFERENCE OF MATERIAL SUBMITTED ON A COMACT DISC

Not Applicable

BACKGROUND OF THE INVENTION

1. Field of the Invention

The present invention relates to a device and to a process for mode-locking a laser, and in particular a laser functioning in pulsed mode.

2. Description of Related Art

A laser cavity consists of an optical gain medium placed inside a resonator delimited by two mirrors oriented in auto-collimation, that is to say face to face. When the gain medium is activated, an optical oscillation is maintained in the cavity, such that the device can emit a light beam characterized by a very high spatial and spectral brightness.

The mode-locking of a laser cavity consists in forcing short light pulses to circulate in said resonator, so as to generate pulses of high peak intensity and with a pulse length typically of less than 100 picoseconds, which may be upto a few femtoseconds depending on the gain medium used.

Lasers which may be distinguished include lasers of the continuous type in which the gain medium is permanently activated, that is to say over time scales of from several seconds to several hours. A continuous mode-locked laser may thus generate short pulses at a repeat rate of the order of a few tens to a few hundreds of megahertz, corresponding to the circulation (to and fro) time of the pulses in the resonator.

This high repeat rate implies that a laser of this type will emit low-energy light pulses. Nevertheless, this type of laser is adequate for many applications which require a high mean optical power but which can make do with low pulse energy, such as the LIDAR technology, or "linear" absorption spectroscopy, photoionization spectroscopy, fluorescence spectroscopy, etc.

Moreover, lasers of pulsed type exist, which are characterized by a very low working cycle of the gain medium (of less than $1/50$). This gain medium is activated for a short period, typically of less than one millisecond at a low repeat rate typically of a few tens of hertz. In pulsed mode, the gain medium may be temporarily very highly activated, corresponding to a large storage of optical energy in the gain medium, such that a mode-locked pulsed laser will be able to generate pulses of markedly greater energy than those generated by mode-locked lasers of continuous type. However, the fact, firstly, that the amplification factor of the gain medium is not constant during the transient activation period, and, secondly, that the stabilization of the optical oscillation in the laser cavity is a dynamic process which requires a certain amount of time and may thus be incomplete during the activation time of the gain medium, limits the efficiency of the mode-locking and consequently the brevity and energetic stability of said optical pulses generated.

Pulsed lasers are used in manufacturing processes which require high-energy optical pulses, such as for the ablation of materials, laser cutting and surface treatment, and also for "non-linear" optical spectroscopies such as multi-photon resonant ionization or frequency-sum generation spectroscopy, and also any technique requiring a low repeat rate of the laser (time-resolved measurements).

One way for mode-locking lasers of pulsed type is to insert a cell containing a dye (liquid solvent), optionally combined with an intensity limiter, into the laser cavity. This device has several drawbacks, in particular:

the mobility and inhomogeneity of the solvent circulating in the cell are factors causing energy instability of the emitted pulses;

the chemical or photochemical degradation of said dye makes it necessary for technicians to intervene regularly in order to optimize the mode-locking process.

Document U.S. Pat. No. 4,914,658 describes a solid-state laser such as a Neodymium-doped Yttrium Aluminium Garnet (Nd:YAG) which is combined with a non-linear crystal and a dichroic mirror in order to create a non-linear optical means for mode-locking the laser. In the simplest embodiment of the device, the non-linear crystal makes it possible to generate a beam at the second harmonic from the fundamental beam amplified by the gain medium. The oscillation in the resonant cavity of the portion of the fundamental beam not converted by the non-linear crystal is negatively discriminated by means of a dichroic mirror which must have a reflection coefficient at the second harmonic frequency which is greater than that at the fundamental frequency.

Adjusting the optical distance between the non-linear crystal and the dichroic mirror makes it possible to obtain a suitable phase shift between the fundamental beam and the beam at the second harmonic, so as to obtain an efficient reconversion of the beam at the second harmonic into a fundamental beam in the non-linear crystal. This phase shift can also be obtained by inserting a transparent plate between the non-linear crystal and the dichroic mirror.

The non-linear optical means serves to increase the quality factor of the laser cavity, that is to say to reduce the energy losses of the laser beam by reflection against the dichroic mirror, when the instantaneous power of the beam at the fundamental frequency generated by the gain medium increases. In other words, the non-linear optical means induces a positive feedback on the quality factor of the laser cavity as a function of the instantaneous power of the beam at the fundamental frequency.

The non-linear optical mode-locking device is also characterized in that the ratio of the beam power at the second harmonic relative to the beam power at the fundamental frequency increases as the power of the beam at the fundamental frequency increases.

Document EP-A-0 951 111 proposes a device and a method for mode-locking a laser, preferably also working in continuous mode, which are based on the principle described in document U.S. Pat. No. 4,914,658. In this case, it is proposed to convert part of the laser beam at the fundamental frequency into a beam at the second harmonic by using a non-linear crystal. The oscillation in the resonant cavity of the part of the fundamental beam not converted in the non-linear crystal is negatively discriminated by means of the combination of a retardation plate and a polarizer. In said document, the gain medium is Nd:vanadate, the non-linear crystal is lithium triborate and the retardation plate has a retardation of $\lambda/4=1064$ nm and $\lambda/2=532$ nm. The retardation plate is placed between the non-linear crystal and the dichroic mirror, while the polarizer is placed between the gain medium and the non-linear crystal.

It is pointed out in said document that the dichroic mirror, placed behind the non-linear crystal, has a reflection coefficient at the second harmonic frequency which is not greater than the reflection coefficient at the fundamental frequency.

The non-linear optical means described in said document serves to increase the quality factor of the laser cavity, that is to say, to reduce the energy losses of the laser beam by reflection against the polarizer, when the instantaneous power of the beam at the fundamental frequency generated by the gain medium increases. In other words, the non-linear optical means induces a positive feedback on the quality factor of the laser cavity as a function of the instantaneous power of the beam at the fundamental frequency.

The devices described in the two above-mentioned documents U.S. Pat. No. 4,914,658 and EP-A 0 951 111 allow the efficient mode-locking of continuous lasers. For example, pulses as short as ~10 picoseconds FWHM (full width at half maximum) can be generated when an Nd:YAG gain medium is used. However, these devices do not work properly in the case of pulsed lasers. The shortest pulse widths ever obtained by means of the device as described in document U.S. Pat. No. 4,914,658 are 35 picoseconds FWHM (full width at half maximum) in the case of a pulsed Nd:YAG laser. These poor performance levels result from the fact that the gain factor of the active medium, the energy of the optical pulses and thus the conversion yield for the non-linear crystal used in the non-linear device vary greatly in the course of the activation period of the gain medium, which prevents any stabilization of the optical oscillation in the resonant cavity. Moreover, the small number of to-and-fro cycles within the cavity, and thus of interaction with the non-linear device, produced by the optical pulses during the activation time of the gain medium also limits the efficiency of the mode-locking.

BRIEF SUMMARY OF THE INVENTION

The present invention aims to provide a device and a process for mode-locking a laser, making it possible to obtain particularly short pulses and having great energy stability, even in the case of a pulsed laser.

In particular, the present invention aims to overcome the drawbacks of the devices and processes of the prior art.

In particular, the present invention aims to propose a device consisting only of solid components, and thus being simple to maintain when compared with devices using dyes (liquid solvents), and which is robust and inexpensive. In addition, the various constituents used will show a low level of degradation over time.

The present invention relates to a device for mode-locking a laser, in particular a laser of pulsed type, comprising a laser cavity delimited by a first mirror and a second mirror, provided with an active medium for amplifying the laser beam at the fundamental frequency, and a solid non-linear optical means which comprises at least said second mirror and which has a reflection coefficient which increases as the beam intensity increases, characterized in that said device further comprises in the laser cavity a solid intensity limiter whose transmission coefficient of the fundamental beam decreases as the intensity of said laser beam increases.

More specifically, whereas the devices as described in document U.S. Pat. No. 4,914,658 and EP-A-0 951 111 display, by using a non-linear optical means, only a positive feedback on the quality factor of the laser resonant cavity as a function of the power of the fundamental beam, the device according to the present invention displays, by the combined use of the non-linear optical means and the intensity limiter, both a positive feedback and a negative feedback on this quality factor. This is due to the fact that the non-linear optical means has a reflection coefficient which increases as the intensity of the fundamental beam increases, whereas the intensity limiter has a transmission coefficient at the fundamental frequency of the laser which decreases as the intensity of the fundamental beam increases.

The combined use of the non-linear optical means and the intensity limiter implies that the power ratio of the beam at the second harmonic relative to the fundamental beam no longer increases as the intensity of the fundamental beam increases when said intensity exceeds the operating threshold of the intensity limiter.

Advantageously, the non-linear optical means comprises said second mirror which corresponds to a dichroic mirror and a non-linear crystal able to convert the laser frequency.

The non-linear optical means may also comprise only said second mirror, which then corresponds to a Fabry-Perot anti-resonant saturable absorber constructed from a superposition of dielectric or metallic semiconductor films.

The non-linear optical means may also comprise said second mirror which corresponds to a dichroic mirror, a frequency-converting non-linear crystal and at least one polarizer.

Advantageously, the intensity limiter consists of a plate made of a semiconductor material such as GaAs, CdSe or InP.

Alternatively, the intensity limiter consists of a non-linear crystal which converts the fundamental beam into a beam at a harmonic frequency.

Alternatively, the intensity limiter consists of an active device, that is to say an electronically controlled device which induces increasing energy losses in the cavity when the intensity of the fundamental beam increases, such as Pockels cell or an acousto-optical modulator.

Advantageously, the intensity limiter is arranged between the gain medium and the non-linear optical means.

In a particularly advantageous manner, the intensity limiter and the non-linear optical means are arranged on either side of the gain medium.

The present invention also relates to a process for mode-locking a laser, in particular a laser of pulsed type, which comprises:
  emitting a laser radiation beam at the fundamental frequency by stimulating an active laser medium,
  converting the beam at the fundamental frequency into a beam at a harmonic frequency,
  returning the beam at the harmonic frequency to the resonant cavity,
  reconverting the beam at the harmonic frequency into a beam at the fundamental frequency,
intensity limitation of the beam at the fundamental frequency inside the resonant cavity.

DETAILED DESCRIPTION OF THE INVENTION

Figure 1:
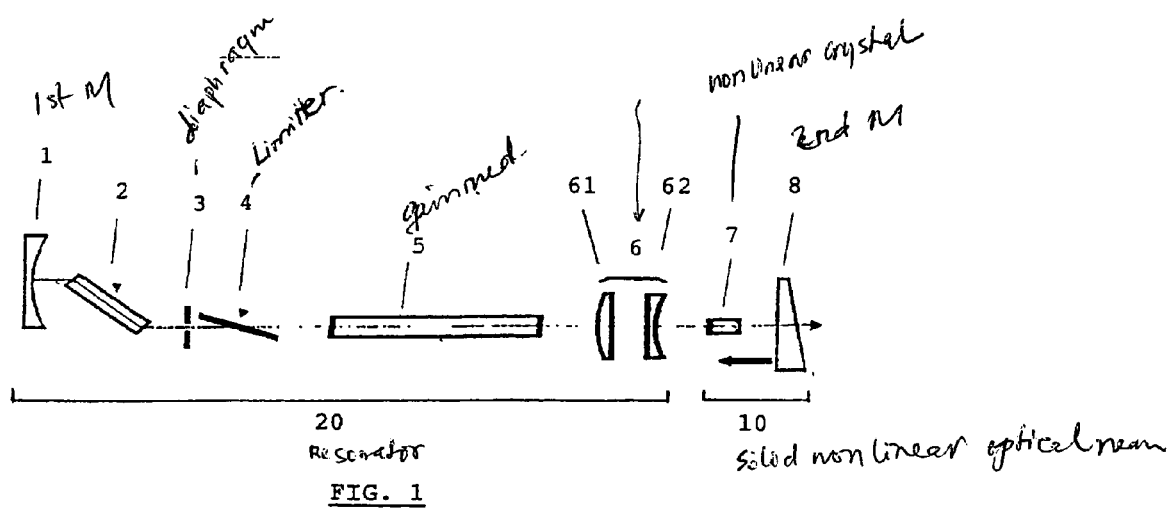
FIG. 1 describes one particular embodiment of the device for obtaining an Nd:YAG oscillator according to principle of the present invention.

FIG. 1 describes, by way of example, one embodiment of the device according to the invention. In a conventional manner, firstly, a resonant cavity 20 delimited by a first mirror 1 and a second mirror 8 and, secondly, a non-linear optical means 10 comprising said second mirror 8 are produced. The first mirror 1 is of high, preferably total, reflection, and the second mirror 8 is a dichroic mirror. Inside the resonant cavity 20 is arranged an active medium 5 which may, in a conventional manner, be an Nd:YAG (Neodymium-doped Yttrium Aluminium Garnet), Yb:YAG, Cr:YAG, Nd:YLF, Nd:glass, Ti:sapphire, Cr:forsterite or Yb:glass medium. The medium is adapted to emit, under stimulation, laser radiation at a fundamental frequency $\omega 1$. The choice of such a medium is dictated by the desired wavelength of the laser and the desired spectral width of the gain.

According to one embodiment of the invention, the gain medium is a bar of Nd:YAG crystal 5 with dimensions of 115×7 mm which is pumped by two flash lamps for stimulating a laser beam at a fundamental frequency $\omega 1 = 1064$ nm.

The energy of the electric pump is −17 J, whereas the repeat frequency is 20 Hz.

Two lenses 61 and 62 provided with an anti-reflection coating and characterized, respectively, by focal distances of 100 and −40 mm form the telescope 6. A 0.8 mm diaphragm 3 limits the working of the laser to only one transverse mode. The intensity limiter intended for the active mode-locking according to this embodiment comprises an AOML (acousto-optical mode-locker) component 2 located close to the mirror of high reflection 1 and a GaAs plate 4. The total length of the cavity is approximately 1.5 m and is adapted to the 100 MHz modulation frequency of the AOML.

The non-linear optical means 10 comprises, in addition to the dichroic mirror 8, according to the embodiment represented in FIG. 1, a non-linear crystal 7 of BBO type with a length of 3 mm, for generating a beam at the second harmonic ($\omega 2 = 532$ nm) by a type I interaction. The non-linear optical means 10 has a reflection coefficient of greater than 99% at 532 nm and equal to 25% at 1064 nm. Other non-linear crystals may be used, such as LBO (lithium triborate), KDP (potassium dihydrogen phosphate), KTP (potassium titanyl phosphate), BBO (beta-barium borate), PPLN (periodically poled lithium niobate) or $KNbO_3$ (potassium niobate). The GaAs plate is aligned at the Brewster incident angle. Adjustment of the distance separating the non-linear crystal 7 of the dichroic mirror 8 allows the phase shift between the fundamental beam and the beam at the second harmonic to be controlled during the reconversion process.

When this distance is correctly adjusted, an appreciable increase in the intensity of the beam generated by the cavity is observed, which reveals the efficient passive mode-locking of the YAG oscillator.

The mean output power of the laser cavity is −30 mW (pulse train energy=1.5 mJ) for an electric pump energy of −17 J when the AOML component 2 is used in the cavity.

Figure 2:
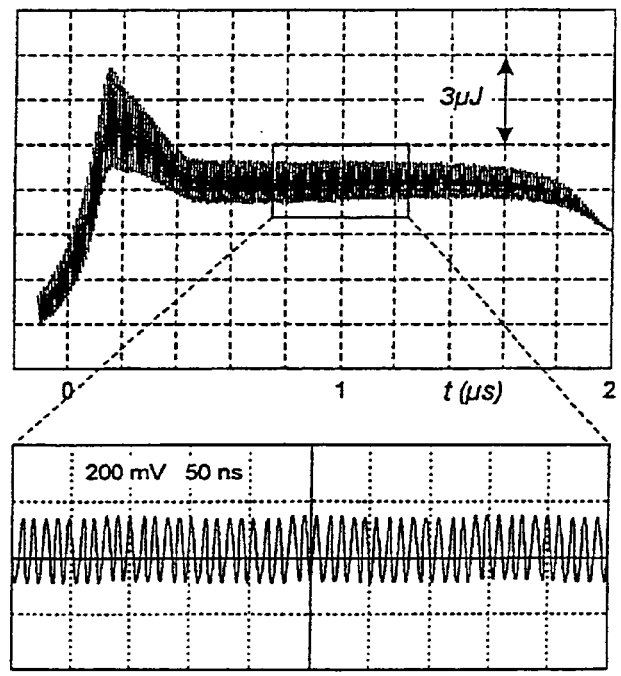
FIG. 2 represents the pulse train envelope obtained for the Nd:YAG oscillator as described in FIG. 1.

FIG. 2 represents the 2 $\mu s$ long pulse train envelope as measured by a p-i-n photodiode with an oscilloscope bandwidth of 60 MHz. The first part of the envelope (0–500 ns) is characterized by a rapid variation in the pulse energy and is followed by a plateau from 600 to 1800 ns characterized by a virtually constant pulse energy, estimated to be 10 $\mu J$/pulse.

Although previous studies revealed that this device could work without active mode-locking, much more stable working of the YAG oscillator has been observed when the AOML component is used in the cavity.

Figure 3:
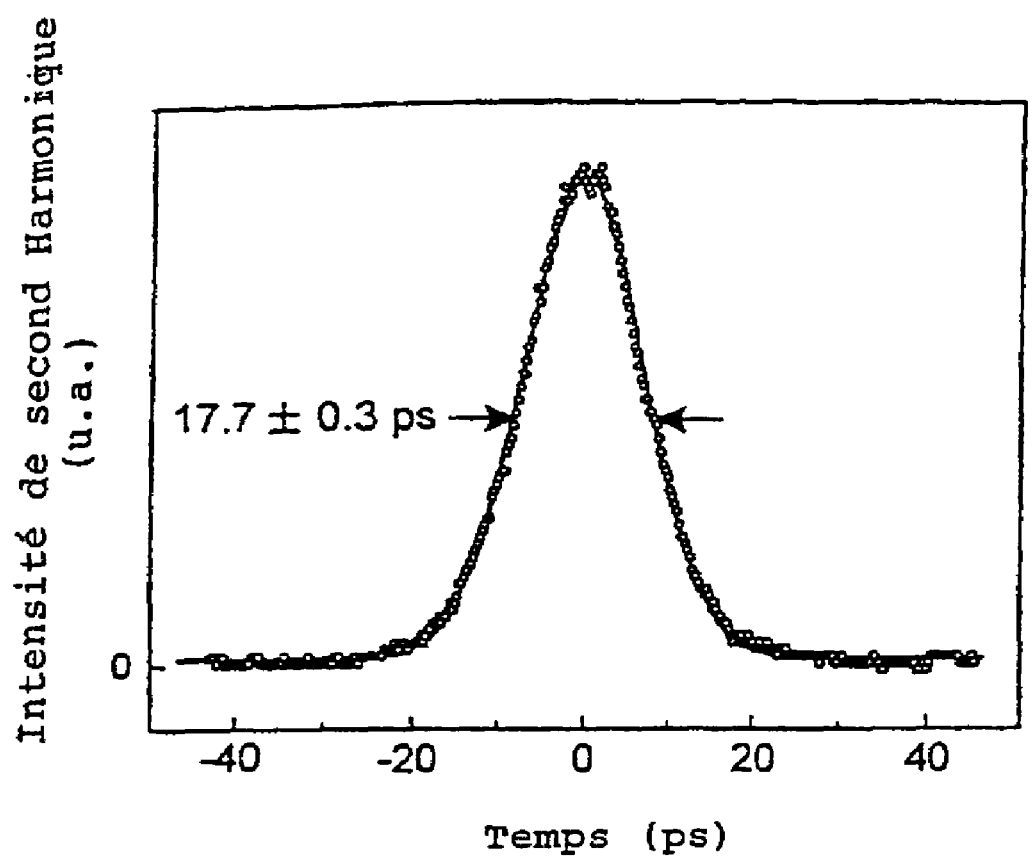
FIG. 3 represents the measurement of the pulse width which is carried out by a standard noise-free second-order auto-correlation.

FIG. 3 shows the measurement of the pulse width at the centre of the plateau of the train envelope. This measurement is performed by noise-free standard second-order auto-correlation by synchronizing the 50 ns window of the auto-correlation signal integrator with the centre of the stable plateau of the train envelope.

Assuming a gaussian distribution, a pulse width of 12 ps FWMH is deduced for the fundamental pulse. The peak intensity inside the cavity reaches a value of the order of 55 $MW/cm^2$, which is in accordance with the start of the two-photon absorption in a GaAs semiconductor.

In conclusion, it is possible to obtain a pulse width reduced to 12 ps or even less using a pulsed Nd:YAG laser pumped with a flash lamp, by combining a passive negative feedback component constituting the intensity limiter, which is a GaAs plate in the present case, with a positive feedback component, which is a non-linear optical means in the present case, consisting of a frequency-doubling non-linear crystal (BBO) coupled to a dichroic mirror.

The increase in the number of to-and-fro cycles performed by the optical pulses and also their energy stabilization induced by the intensity limiter are two key factors for obtaining short pulses. The width of these pulses is very close to the lower limit of ~10 ps, set by the Fourier transform of the gain spectrum of the Nd:YAG gain medium.

The pulsed laser equipped with the device described in the present document has ideal characteristics for the synchronous pumping of an optical parametric oscillator.

Moreover, the interposition, inside or outside the cavity, of passive and active components for polarization selection and modification, such as a Pockels cell, polarizers and retardation plates, will make it possible to select energetic single pulses.

SEQUENCE LISTING

Not applicable

What is claimed is:

1. A device for a mode-locking laser, comprising a resonant cavity,
   delimited by a first mirror and a second mirror,
   provided with an active laser gain medium arranged in the resonant cavity for amplifying a laser radiation beam at the fundamental frequency, and
   with a solid non-linear optical means which comprises at least said second mirror, for reversible conversion of the radiation at the fundamental frequency into radiation at a barmonic frequency, said non-linear optical means having a reflection coefficient which increases as the intensity of the radiation at the fundamental frequency increases,
   said device further comprising a solid intensity limiter, arranged in the resonant cavity, whose transmission coefficient of the laser radiation passively decreases as the intensity of said radiation increases, wherein said intensity limiter comprises a GaAs, CdSe or InP plate.

2. The device according to claim 1, wherein the non-linear optical means corresponds to a dichroic mirror and a non-linear crystal that converts the radiation at the fundamental frequency into radiation at a harmonic frequency.

3. The device according to claim 1, wherein the non-linear optical means comprises said second mirror which corresponds to a dichroic mirror, a non-linear crystal that converts the radiation at the fundamental frequency into radiation at a harmonic frequency, and at lest one component for polarization selection and/or modification.

4. The device according to claim 2, wherein said non-linear crystal is a BBO crystal.

5. The device according to one of claim 1, wherein the non-linear optical means comprises only the second mirror, wherein said second mirror corresponds to a Fabry-Perot anti-resonant saturable absorber constructed from a superposition of dielectric or metallic semiconductor films.

6. The device according to claim 1, wherein the intensity limiter and the non-linear optical means are placed on either side of the active gain medium.

7. The device according to claim 1, wherein the intensity limiter is placed between the nonlinear optical means and the active gain medium.

8. The device according to claim 1, wherein the active gain medium is an Nd:YAG crystal.

9. The device according to claim 1, wherein the non-linear optical means has a reflection coefficient of the radiation at the second harmonic which is greater than the reflection coefficient of the radiation at the fundamental frequency.

10. A device for a mode-locking a laser, comprising a resonant cavity,
  delimited by a first mirror and a second mirror,
  provided with an active laser gain medium arranged in the resonant cavity for amplifying a laser radiation beam at the fundamental frequency, and
  a solid nonlinear optical means which comprises at least said second mirror, for reversible conversion of the radiation at the fundamental frequency into radiation at a harmonic frequency, said non-linear optical means having a reflection coefficient which increases as the intensity of the radiation at the fundamental frequency increases,
  wherein said device is provided with an intensity limiter comprising a GaAs, CdSe or InP plate with a transmission coefficient which passively decreases as the intensity of the radiation at the fundamental frequency increases, so as to ensure, in combination with said non-linear optical means, both a positive feedback and a negative feedback on the quality factor of the resonant cavity.

11. A process for a mode-locking a laser comprising:
  emitting a laser radiation beam at the fundamental frequency by stimulating an active laser medium,
  converting the beam at the fundamental frequency into a beam at a harmonic frequency,
  returning the beam at the harmonic frequency to the resonant cavity,
  reconvening the beam at the harmonic frequency into a beam at the fundamental frequency, and
  passively limiting the intensity of the beam at the fundamental frequency inside the resonant cavity, by means of at least one GaAs, CdSe or InP plate.

* * * * *